May 4, 1954     D. C. PRINCE     2,677,431
UNIVERSAL ROTOR MOUNTING
Filed Oct. 21, 1950
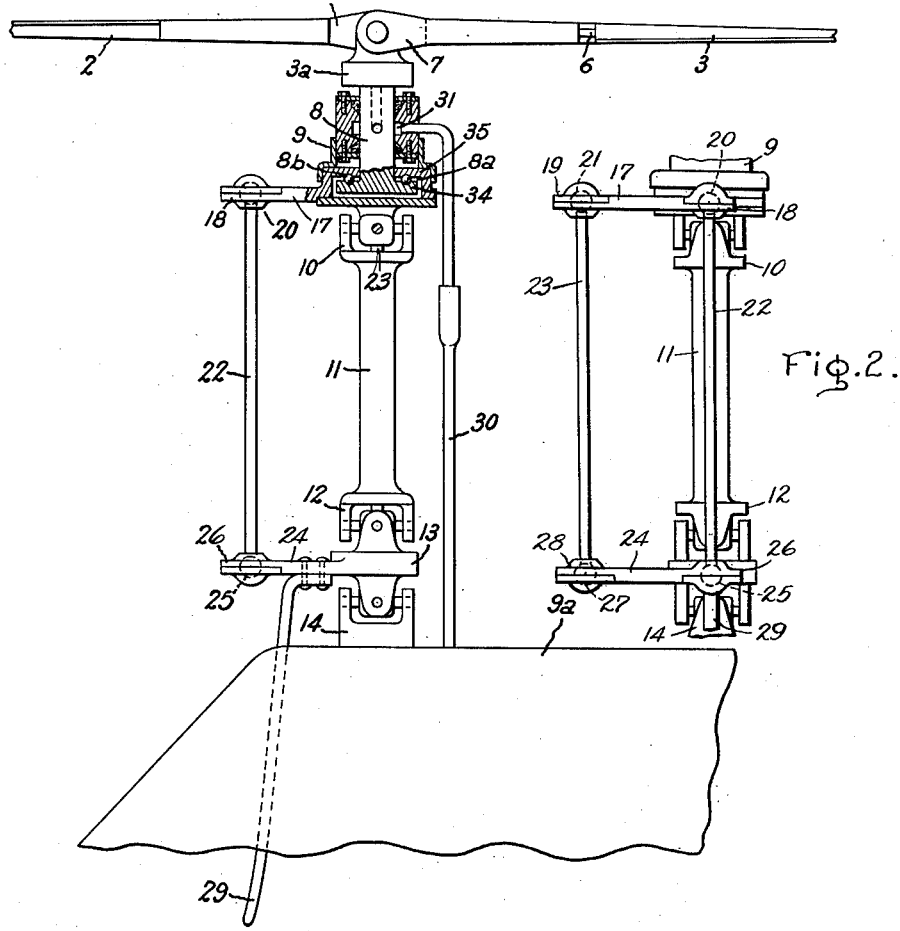
Inventor:
David C. Prince,
by Paul A. Frank
His Attorney.

Patented May 4, 1954

2,677,431

UNITED STATES PATENT OFFICE 2,677,431

UNIVERSAL ROTOR MOUNTING

David C. Prince, Schenectady, N. Y., assignor to General Electric Company, a corporation of New York Application October 21, 1950, Serial No. 191,433

1 Claim. (Cl. 170—160.27)

This invention relates to rotary wing aircraft and, in particular, to an improved suspension for a fuselage of an aircraft from such a rotary wing.

In rotary wing aircraft, wherein a fuselage is suspended from a rotating wing, a serious problem is brought about by the lateral movement of the wing through the air during rotation.

Specifically, in a vertical climb, a rotating wing is given a lift force dependent upon the rate at which it cuts through still air. If the wing is moved laterally while rotating, however, an unbalanced lift is given to the wing, due to the variation in the relative air velocity acting on a wing in any one revolution. This may best be understood by looking at a rotating blade from above and comparing the portions of a blade with the face of a clock. Under these conditions, assuming that the plane is flying towards 12 o'clock with its wing rotating counterclockwise, then at 3 o'clock the blade is acted upon by an air velocity equal to the instantaneous tangential velocity of the wing plus the lateral velocity of the plane. At 12 o'clock, the wing is given a lift force supplied only by its instantaneous tangential velocity; at 9 o'clock, the lift is supplied by an air velocity equal to the instantaneous tangential velocity of the rotor minus the lateral velocity of the aircraft. At 6 o'clock, the conditions are similar to those at 12 o'clock. It is obvious, then, that in any complete revolution of a wing its lifting force and its drag are cyclically varied.

This cyclic variation in both the lift and drag presents a serious vibrational problem, causing the wing hub to move about its normal or still air axis.

If a rotating blade and its supporting shaft are rigidly secured to a fuselage of an aircraft, then, these vibrations that are produced in the shaft of the rotating blade are transmitted to the fuselage where they occasionally reach the harmonic vibration frequency of the plane to produce disastrous results.

In an attempt to reduce these vibrational forces, spring loaded flap hinges are used to suspend a wing from its supporting hub. Flap hinges allow the blade to change its vertical position relative to the hub while the spring absorbs much of the vibration without influencing the axis. Furthermore, drag hinges which permit oscillation of a wing in its own plane have been used on such aircraft to reduce the drag effect of the changing of lateral force upon the wing.

While these two innovations have considerably helped the vibration problem, the fact that drag hinges allow the blade to oscillate back and forth with respect to its static or still air axis is offset by the fact that the blades are continually changing, passing forward and behind their static position to produce a centrifugal force on the hub of the wing, which again tends to set up undesirable vibrational effects in the fuselage. With these considerations in mind, it is obvious that there is still much room for improvement in the mounting of a rotating blade on the fuselage of a rotary wing aircraft.

It is an object of this invention to provide a new and improved mounting support for a rotating blade on the fuselage of an aircraft.

It is a further object of this invention to provide a linkage connection between a rotating blade and the fuselage of the plane that permits the rotating blade to move in a plane about its static axis without vibrating the fuselage.

It is a still further object of this invention to provide a new and improved simple method of removing the vibrational forces that effect the rotor and fuselage of a rotating blade.

Further objects and advantages of this invention will become apparent and the invention will be more clearly understood from the following description referring to the accompanying drawing, and the features of novelty which characterize this invention will be pointed out with particularity in the claim annexed to and forming a part of this specification.

Briefly, this invention comprises the employment of a double universal joint and a parallelogram type supporting device for suspending the fuselage of a plane from a rotating blade or wing. With the combination of the double universal joint and the parallelogram support, vibrational stresses that are set up in the hub of the rotating blade are not transmitted to either the control stick within the fuselage or the fuselage itself.

Referring to the drawing, Fig. 1 is a side elevation partly in section of the improved suspension system and control; Fig. 2 is a front elevation primarily, of the improved control; while Fig. 3 is a top elevation of the mechanism shown in Fig. 1.

In the drawing, a rotor 1 is shown comprising a pair of blades 2 and 3, mounted on a hub 3a. Blade 2 is supported on hub 3a by a drag hinge 4 and a flap hinge 5, while blade 3 is supported on hub 3a by a drag hinge 6 and a flap hinge 7. As has been mentioned, the drag hinges function to absorb the vibrations produced by the varying drag load on a blade in passing through changing relative air velocities in one revolution. The flap hinges absorb the vertical vibration caused by the fluctuation in lift force, due to varying relative air velocities in any one revolution. Hub 3a is connected by a shaft 8 to a thrust bearing 8a. The thrust bearing 8a, which is mounted in bearing housing 9, provides vertical support for fuselage 9a of a helicopter or the like. A universal joint 10 is mounted on bearing housing 9 and is connected by shaft 11 to a universal joint 12 and thence by joint member 13 to universal joint 14. Universal joint 14 is rigidly secured to the fuselage 9a.

A plate 17 is secured to bearing housing 9 and is provided with a pair of sockets 18 and 19 which are located 90° apart and in substantially the same plane. A ball 20 and a ball 21 are connected by means of rods 22 and 23, respectively, to a plate 24 which is rigidly secured to member 13. Specifically, rod 22 is mounted on plate 24 by means of a ball 25 fitting into a socket 26 provided in the plate 24 while rod 23 is mounted by means of a ball 27 fitting into a socket 28 at a portion displaced 90° from socket 26 and underlying socket 13.

A control stick 29 is rigidly secured to plate 24 and extends down into the fuselage 9a of the plane. The control stick 29 provides for the movement and tilting of the hub 3a to change the plane of rotation of the rotor 1.

The operation of the device shown in the drawing is as follows. Rotor 1 rotates in unison with hub 3a. The rotation of the rotor 1 may be produced by any external source, such as wing tip jet units, or it may rotate merely through wind-milling action, if this particular device or helicopter is used as a glider. The means for rotating rotor 1 is not within the scope of this invention and, consequently, no limitation is intended to be implied from any particular means of rotation described. If jet unit type rotation were selected, fuel line 30 would be brought into a pressure coupling 31, whereupon flexible hoses 32 and 33 would carry fuel to jet units not shown located on wings 2 and 3, respectively.

In the rotation of rotor 1, a great deal of the shock produced in the blades due to the movement in the lateral path of the fuselage is absorbed by the drag hinges 4 and 6. By this is meant that as an increase drag is put onto the blade 3—maximum and minimum drag occur when the tangential velocity of the blade is parallel to the path of the fuselage—the drag hinge 6 allows blade 3 to be displaced from the radial line through the axial center of hub 3 and pin 6a of drag hinge 6. The movement of blade 3 off this radial line absorbs some of the shock that is produced by the varying drag that is placed on blade 3. Obviously, the same thing happens with blade 2 and drag hinge 4.

Any variation in the vertical position of the blades during one rotation of rotor 1 due to changing relative velocities, as heretofore explained, is partially absorbed by the flap hinges 5 and 7.

Hub 3a, as has heretofore been described, is rigidly secured to shaft 8, which, in turn, is secured to thrust bearing 8a. Thrust bearing 8a can be of any conventional form. For example, ball bearings 8b can be positioned between two plates 34 and 35 with plate 34 secured to shaft 8 and plate 35 being an integral part of bearing housing 9. This connection provides adequate suspension for fuselage 9a, since bearing housing 9 does not rotate and support is provided between fuselage 9a and bearing housing 9 through shaft 11 and the universal joints 10, 12, and 14, previously described.

The universal joints 10, 12, and 14, allow the plane of rotor 1 to take a convenient position relative to the vertical axis of joint 14. This plane of rotor 1 is the means for directing the path of fuselage 9a. That is, by tilting the plane of the rotor in any one direction, the rotor then provides a sustaining or lifting force, plus a component of movement in the direction of the tilt. Specifically, take the plane of the tilt and pass a line perpendicularly through the center of hub 3a and then relegate this line into a vector in a vertical direction and a vector in the horizontal direction. The vector in the horizontal direction then gives the direction of flight of the fuselage.

The parallel linkage joining plate 17 with plate 24 allows for the movement of hub 3a about the vertical axis through joint 14. Consequently, hub 3a can oscillate in its own plane without transmitting these oscillations to plate 24 and joint member 13. The parallel linkage and the ball and socket joints previously described provide for the tilting of the plane of rotor 1 by means of lever 29. With this structure, then, the tilt of the plane at rotor 1 can be controlled and, thus, the direction of flight of the fuselage 9a can be controlled.

More specifically, if lever 29 is pulled counterclockwise with respect to plate 24 (see Fig. 1), then plate 24 is pulled downwardly counterclockwise about member 13, whereupon rods 22 and 23 pull down plate 17 in counterclockwise direction about the bearing housing 9. Bearing housing 9, consequently, is tilted about its own axis counterclockwise to change the tilt of shaft 8, hub 3a, and, consequently, the plane of rotor 1. In like manner, if lever 29 is pulled outwardly from the plane of the paper (see Fig. 1), then plate 24 is tilted in accordance therewith, such that ball and socket joint 25 and 26 may rotate without being changed vertically while ball and socket joint 27 and 28 is lowered. In consequence, ball and socket joint 20 and 18 will rotate while ball and socket joint 21, 19 is lowered and the plane of plate 17 at bearing housing 9 is thus varied to tilt the plane of rotor 1 in accordance with the tilt of lever 29. It is to be pointed out specifically that such movements take place irrespective of the position of bearing housing 9 with respect to the axis of member 14. That is, bearing housing 9 can be moving about the axis through member 13 and still the described tilting control will be provided to bearing housing 9 and the plane of rotor 1 by means of lever 27.

This new and improved support for a fuselage from a sustaining rotor gives a flexible, yet secure, control. The plane of the rotor may be tilted to any desired position; the hub of the rotor may travel in any path, being constrained only by a fixed length between the hub 3a and support member 14. It should be noted that any lateral vibrations caused by the fact that the center of rotation of the rotor 1 is not the exact center of the shaft 8, will be absorbed before the vibrations reach the plate 24 by the double universal joints 10 and 12 and the parallelogram support including plates 17 and 24 and rods 22 and 23. It is clear from the Figs. 1 and 2 that plate 17 may move laterally without transmitting this lateral movement to plate 24. In Fig. 1 for instance, if plate 17 vibrates forward, balls 20 and 21 and universal joint 10 will move forward and rotate with respect to their joints. This will cause the balls 25 and 27 and universal joint 12 to rotate in their respective joints. The result of this is that the rods 22 and 23 and shaft 11 are slanted with respect to plates 17 and 24. It is clear that plates 17 and 24 remain parallel, and, for the vibrations in question, the distance between the plates is not substantially changed. Furthermore, a great deal of the vibrations that are produced in the blades 2 and 3 by the fluctuation of air resistance are absorbed before they reach the plate 24 by the drag hinges and the flap hinges. This is the desired end result, which is a great improvement over the prior art.

Modifications of this invention will occur to those skilled in the art and it is desired to be understood, therefore, that this invention is not to be limited to the particular embodiment disclosed, but that the appended claim is meant to cover all the modifications which are within the spirit and scope of this invention.

What I claim as new and desire to secure by Letters Patent of the United States is:

A rotary wing aircraft comprising a fuselage, a plurality of blades constituting a rotary wing, and the combination of a mechanism for supporting said fuselage from said rotary wing with a linkage system for controlling from within said fuselage the tilt of the plane of said rotary wing, said supporting mechanism comprising a hub, means mounting said rotary blades thereon, a bearing housing having an upper and a lower end, means connecting the upper end of said bearing housing to said hub, means connecting the lower end of said bearing housing to said fuselage, said lower connecting means comprising an upper universal joint, an intermediate universal joint and a lower universal joint positioned in spaced apart relationship, means connecting the upper of said universal joints to said lower end of said bearing housing, means including a shaft member connecting said upper universal joint to said intermediate universal joint, means including a joint member connecting said intermediate universal joint to said lower universal joint, and means supporting the entire load of said fuselage from said lower universal joint, said linkage system comprising a first plate extending radially outwardly from said bearing housing, a second plate extending radially outwardly from said joint member with each of said plates having portions spaced apart 90° with respective portions of each of said plates overlying one another, a control lever integral with said second plate at one end and with its other end extending into said fuselage, and a pair of substantially parallel elements connecting respectively corresponding overlying portions of said first and second plates.

References Cited in the file of this patent

UNITED STATES PATENTS

| Number | Name | Date |
|---|---|---|
| 2,224,357 | Pecker | Dec. 10, 1940 |
| 2,365,357 | Prewitt | Dec. 19, 1944 |
| 2,380,581 | Prewitt | July 31, 1945 |
| 2,395,143 | Prewitt | Feb. 19, 1946 |
| 2,487,646 | Gluhareff | Nov. 8, 1949 |
| 2,569,882 | De Bothezat | Oct. 2, 1951 |

FOREIGN PATENTS

| Number | Country | Date |
|---|---|---|
| 580,109 | Great Britain | Aug. 27, 1946 |
| 61,395 | Netherlands | July 15, 1948 |

OTHER REFERENCES

Serial No. 254,867, Flettner (A. P. C.), published May 25, 1943.